United States Patent [19]

Snyder

[11] 4,120,315

[45] Oct. 17, 1978

[54] VELOCITY CHECK VALVE

[75] Inventor: David E. Snyder, Longview, Tex.

[73] Assignee: U.S. Industries, Inc., New York, N.Y.

[21] Appl. No.: 827,338

[22] Filed: Aug. 24, 1977

[51] Int. Cl.² ............................................. F16K 25/00
[52] U.S. Cl. ................................ 137/454.6; 137/460;
137/517; 137/519.5; 137/DIG. 2
[58] Field of Search ..................... 137/460, 461, 454.6,
137/519.5, 517, DIG. 2

[56] References Cited

U.S. PATENT DOCUMENTS

| 383,877 | 6/1888 | Gale | 137/517 |
|---|---|---|---|
| 3,234,961 | 2/1966 | Arnes | 137/517 |
| 4,039,003 | 8/1977 | Cheek | 137/454.6 X |

FOREIGN PATENT DOCUMENTS 2,249,598  5/1973  Fed. Rep. of Germany ........... 137/460

*Primary Examiner*—Harold W. Weakley

[57] ABSTRACT

A velocity check valve is provided which can be installed in oil and gas well production systems to prevent loss of fluid and possible fire in the event of a break or leak in a control line connected to a high pressure flowline or a vessel, such as a separator. In one aspect, the valve includes a seat sleeve containing a ball biased toward unseated position with the ball and sleeve being dimensioned so that when fluid flow past the ball exceeds a maximum rate, the resulting differential pressure across the ball will cause it to move to seated position. The arrangement is such that the ball is free to rotate, except when seated, so that it can present different areas of its surface to the seat to thereby distribute wear on the ball more evenly over its surface. The seat sleeve and ball can be situated in a bore extending from one end of the valve in such a manner that the seat sleeve and ball can be removed from the housing without disconnecting the valve from a line to which it may be connected. Also, a manual push rod arrangement is provided so that the valve can be manually unseated and when the pushing force is removed from the push rod, it will be automatically returned to its retracted position so that the valve cannot be accidentally left in an override or bypass position.

9 Claims, 1 Drawing Figure

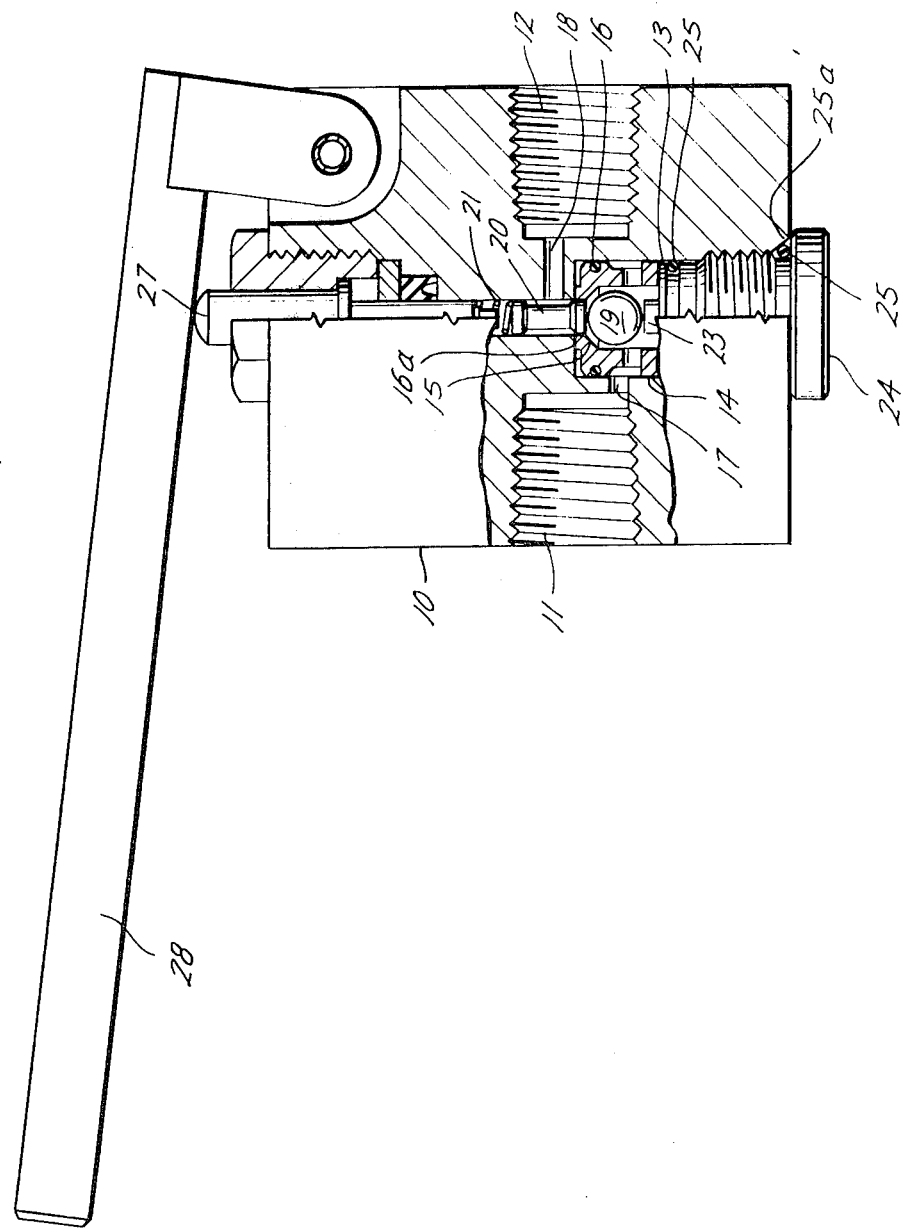

VELOCITY CHECK VALVE

This invention relates to a velocity check valve which is especially adapted for use in oil fields in connection with sensor equipment sensing pressure in flow lines, separators and the like.

Safety valves for an oil or gas well are frequently operated by sensors which sense the pressure in a flow-line or separator and, when such pressure becomes abnormal, function to cause the safety equipment to operate. Thus these sensors have pressure applied to them through a line connected to the flowline, separator or other source of pressure. These sensor lines may be accidentally broken or may develop excessive leaks. Since the fluid in the sensor lines is a hydrocarbon, the resultant escape of fluid can result in a fire or other catastrophe as well as possibly contaminating the environment. Also, lines are used to connect recorders, gauges and other control devices to a pressure source. It has been proposed that a velocity check valve be installed in these lines closely adjacent to the point where they connect to the flowline or separators. The intended purpose of these velocity check valves is to provide a safety shut-off valve to prevent loss of fluid in the event of excessive flow through the lines.

It is an object of this invention to provide a velocity check valve particularly suited for the above service and which utilizes a ball past which fluid can flow to develop a pressure differential across the ball such that when the downstream pressure is below a desired value, the ball will move to a seat, the arrangement being such that the ball is free to rotate to present different seating surfaces for the seat to thereby distribute wear over the ball.

Another object is to provide such a velocity check valve in which a ball and a seat sleeve, as well as other associated operating parts, can be removed from the valve housing for service without removal of the valve housing from the line to which it is connected.

Another object is to provide such a valve which has a manual means operable to move the valve element off its seat and thereby afford a bypass and which must be manually held in bypass position so that when the manual force is removed, the valve element will automatically be seated when flow conditions warrant it whereby the valve cannot be accidentally left in override or bypass position.

Other objects, advantages and features of the invention will be apparent to one skilled in the art upon a consideration of the specification and the drawing wherein there is shown, partially in section and partially in elevation, a preferred embodiment of the invention.

Referring to the drawings, there is provided a housing 10 having an inlet port 11 and an outlet port 12. A bore 13 is provided in the housing with a portion thereof extending to lie between the inlet and outlet ports which, it will be noted, are in-line. A removable seat sleeve is slidably received in the upper end of the bore and is formed with an annular seat 15 at one end. The seat sleeve is provided with a fluid energized seal, such as O-ring 16, to seal between it and the housing.

A ball 19 is disposed in seat sleeve 14 to cooperate with seat 15 to control flow through the valve. The ball and the interior of the seat sleeve are dimensioned so as to restrict flow past the ball when in unseated position to induce a pressure differential across the ball. This differential increases and decreases proportional to increases and decreases in fluid flow rate. When the pressure downstream of the seat and an outlet port 12 decreases below a set value, that is when it materially decreases below the upstream pressure, the resulting increase in pressure differential across ball 19 causes it to push stem 20 upwardly to overcome the bias of spring 21. It will be understood that this bias is insufficient to prevent the ball from moving to seated position when the downstream pressure decreases below the set point.

Movement of the ball from seated position is limited by a stop 23 carried by a closure 24. The latter can have suitable differential pressure seal means, such as O-rings 25, situated to form a seal with the housing. In this connection, metal-to-metal seals are also provided at 16a and 25a which respectively prevent leakage should O-ring 16 or O-rings 25 fail such as in a fire.

In order to permit manual bypassing of the valve, that is to manually open it, a push rod 27 is provided in axial alignment with stem 20 and engaging the other end of spring 21 which serves to normally maintain the push rod in its upper or retracted position. However, when the push rod is moved downwardly, as by operating lever 28, its lower end engages stem 20 to move the latter downwardly to unseat the ball. Thus the spring acts to urge the stem and push rod apart and when the push rod is in its retracted position, the spring biases the stem and valve element to the unseated position. Also, after the push rod has been moved to unseated position so as to cause the ball to be unseated, the spring automatically returns the push rod to its retracted position. This assures that the valve will not be unwittingly left in bypass or open position. Thus, the manual bypass is fail safe and must be held in bypass position and cannot be left accidentally in the bypass position.

The lower end of stem 20 and the upper end of stop 23 each abut the ball when the valve is in open position but are not otherwise attached to the ball. Hence the latter is free to rotate to present different areas of its surface to the seat thereby distributing wear over the ball's surface.

From the foregoing, it will be seen that the valve will allow normal fluid flow required by a sensor, recorder, gauge or other control device but will close in the event of an increase in flow rate above normal. The valve will remain closed as long as the outlet pressure is less than the inlet pressure. The ball will return to its unseated position when the differential pressure across the valve reduces to near zero or when the ball is manually pushed off a seat by an operator using the manual override.

The invention having been described, what is claimed is:

1. A velocity check valve including a housing having an inlet port and an outlet port and a bore located between said ports; a removable seat sleeve slidably received in said bore and having an annular seat at one end; a first passageway communicating said inlet port to the interior of said seat sleeve upstream of said seat; a second passageway communicating said outlet port with said seat on the downstream side thereof; a ball fitting loosely in said sleeve and adapted to engage said seat to prevent flow therethrough; a resiliently biased stem abutting said ball and urging it from seated position; a fixed stop adapted to abut the ball when it is in unseated position to limit its movement away from the seat; the ball and the interior of the seat sleeve being dimensioned to restrict flow past the ball to induce a pressure differential thereacross which increases and decreases proportional to increases and decreases in fluid flow rate, the ball being movable to seated position when pressure on the downstream side materially decreases below the upstream pressure, the bias exerted by the stem being insufficient to prevent such ball movement when said downstream pressure so decreases; the ball when unseated being free to turn to present different portions of its surface to the seat during its movement between seated and unseated positions.

2. The valve of claim 1 wherein said bore extends to one end of the housing and is of a size such that the seat sleeve and ball can be removed without disconnecting the valve from a line in which it is connected, and a removable closure in the outer portion of the bore.

3. The valve of claim 1 wherein the seat sleeve and closure have fluid energized seals with said housing and wherein each also have metal-to-metal seals with said housing situated to prevent loss of fluid therefrom when one or more of the fluid energized seals fail.

4. The valve of claim 2 wherein the stop is carried by said closure.

5. The valve of claim 1 in combination with a push rod mounted in the housing for sliding movement toward and away from said stem, the resilient biasing of the stem being provided by a spring extending between the push rod and stem; stops limiting travel of the push rod between first and second positions; the spring, when the push rod is in its first position, exerting the desired force on the ball when unseated but permitting the ball to seat; and the push rod when moved to its second position, moving the ball to unseated position and then retracting automatically to the first position under the influence of said spring, and/or internal pressure acting on the area of the stem.

6. A velocity check valve including a housing having an inlet port and outlet port and a bore extending from one end of the housing to between said ports; a seat sleeve movable from the exterior of the housing through said bore to the end of said bore and having an annular seat at one end; passageways communicating said inlet and outlet ports respectively with the interior of said sleeve and the exterior thereof downstream of said seat; a ball within said sleeve and adapted to engage said seat; means biasing the ball toward unseated position; the ball and the interior of the seat sleeve being dimensioned to restrict flow past the ball to induce a pressure differential thereacross which increases and decreases proportional to increases and decreases in fluid flow rate, the ball being movable to seated position when pressure on the downstream side materially decreases below the upstream pressure, the bias exerted on the ball being insufficient to prevent such ball movement when said downstream pressure so decreases; said ball being sized so that said seat sleeve can be inserted into and removed from said housing without disconnecting the valve from a line in which it is connected; and a removable closure in the outer end of said bore.

7. The valve of claim 6 wherein the removable means also provides a stop engageable by the ball to limit its movement away from seated position.

8. The valve of claim 6 wherein the seat sleeve and closure have fluid energized seals with said housing and wherein each also have metal-to-metal seals with said housing situated to prevent loss of fluid therefrom when one or more of the fluid energized seals fail.

9. A velocity check valve including a housing having an inlet port and an outlet port; passageway means in the housing communicating the inlet and outlet ports; a valve seat in said passageway means; a valve element movable between seated and unseated positions; a stem extending through the seat to abut the valve element; a push rod slidable in said housing to an unseating position to move the stem in a direction to move the valve element off its seat; a spring between the stem and push rod urging them apart and when the push rod is in retracted position, biasing the stem and valve element to the unseated position of the latter and after the push rod has been moved to unseating position and caused the valve element to be unseated, automatically returning the push rod to its retracted position, the valve element and the passageway means being dimensioned to restrict flow past the valve element to induce a pressure differential thereacross which increases and decreases proportional to increases and decreases in fluid flow rate, the valve element being movable to seated position when pressure on the downstream side materially decreases below the upstream pressure, the bias exerted by the stem and spring being insufficient to prevent such valve element movement when said downstream pressure so decreases.

* * * * *